United States Patent
Stauskas (10) Patent No.: US 10,656,262 B2
(45) Date of Patent: May 19, 2020

(54) AIRBORNE PRECISION DOPPLER VELOCITY RADAR

(71) Applicant: The Boeing Company, Chicago, IL (US)

(72) Inventor: Joseph M Stauskas, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 802 days.

(21) Appl. No.: 14/660,835

(22) Filed: Mar. 17, 2015

(65) Prior Publication Data

US 2018/0074186 A1    Mar. 15, 2018

(51) Int. Cl.
*G01S 13/60* (2006.01)
*G01S 19/52* (2010.01)
*G01C 21/16* (2006.01)
*G01S 19/48* (2010.01)

(52) U.S. Cl.
CPC ............ *G01S 13/60* (2013.01); *G01C 21/165* (2013.01); *G01S 19/48* (2013.01); *G01S 19/52* (2013.01)

(58) Field of Classification Search
CPC ........... G01S 13/62; G01S 13/92; G01S 13/60
USPC ....................................................... 342/104
See application file for complete search history.

(56) References Cited

U.S. PATENT DOCUMENTS

| | | | | |
|---|---|---|---|---|
| 4,053,887 A * | 10/1977 | Holford | ................ | G01S 7/2922 342/114 |
| 5,828,333 A * | 10/1998 | Richardson | ............. | G01S 7/023 342/70 |
| 6,204,800 B1 * | 3/2001 | Neumann | ................ | G01S 13/90 342/104 |
| 6,577,267 B1 * | 6/2003 | Moedl | ..................... | G01P 3/366 342/104 |
| 8,952,841 B1 * | 2/2015 | Ellery | ..................... | G01S 13/60 342/104 |
| 2012/0086606 A1 * | 4/2012 | Mathews | ............. | G01C 21/165 342/461 |

* cited by examiner

*Primary Examiner* — Peter M Bythrow
*Assistant Examiner* — Helena H Seraydaryan
(74) *Attorney, Agent, or Firm* — McDonnell Boehnen Hulbert & Berghoff LLP (57) ABSTRACT

Methods and systems for a precision Doppler-based airborne platform velocity measurement system are presently disclosed. An example method comprises transmitting a radar signal with an antenna of an airborne platform. The method also includes receiving at least one radar reflection with the antenna. As part of the method, one or more processors may be configured to determine (i) a falling edge of a Doppler signature of the received radar reflection and (ii) a signal representative of an airspeed based on the falling edge of the Doppler signature. Additionally, the method includes providing the determined signal to an inertial measurement system. Further, the method includes determining location parameters of the airborne platform by the inertial measurement system, including determining at least one sensor adjustment for the inertial measurement unit based on the determined signal. Finally, the method includes operating the inertial measurement system with the sensor adjustment.

22 Claims, 5 Drawing Sheets

AIRBORNE PRECISION DOPPLER VELOCITY RADAR

FIELD

The present disclosure relates generally to a radar system for use on an airborne platform, such as an airplane. In further examples, the radar system may be configured to provide a measurement of the velocity of the airborne platform.

BACKGROUND

Radio detection and ranging (RADAR) systems can be used to actively estimate parameters of environmental features by emitting radio signals and detecting returning reflected signals. Radar systems can determine the distance to radio-reflective features according to a time delay between transmission and reception. Radar systems can also emit a radio signal that varies in frequency over time, such as a signal with a time-varying frequency ramp or chirp, and then based on the difference in frequency between the emitted signal and the reflected signal estimate range. Some systems may also estimate the relative motion of objects causing radar reflections based on Doppler frequency shifts in the received reflected signals.

A radar system of an airborne platform may be configured to provide information to computational and navigational systems of the airborne platform. The radar system may be able to provide information related to objects that reflect radar signals back to the radar system. The objects that provide radar reflections may be other airborne platforms, ground-based objects, or other objects within the range of the radar system.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped.

A navigation system of an airborne platform may be able to determine navigational information of the airborne platform. The navigational information may include both an airspeed and a location of the airborne platform. In many typical situations, location information may be provided through satellite-based location systems, such as the Global Positioning System (GPS), Global Navigation Satellite System (GLONASS), or the Galileo global navigation satellite system (GNSS). Additionally, GPS, GLONASS, and GNSS may be able to provide the airspeed of the airborne platform as well.

In some instances, satellite-based location information may not be available to an airborne platform. For example, a hardware failure or radio jamming may cause satellite-based location information to not be available to the airborne platform. In these instances, it may be desirable to have another system capable of providing location information to the airborne platform. Inertial-based location systems are capable of providing location information based on the movement of the airborne platform from a know reference point. Inertial-based location systems may be known as dead-reckoning based location systems. One shortcoming of inertial-based location systems is the susceptibility to sensor errors, such as sensor drift. For example, if a sensor has a drift (or other error or bias), location information provided by the inertial-based location system may decrease in accuracy as the amount of time the system is used increases. In view of the foregoing, there is a need to develop a system or method that enable a navigation system to correct for sensor errors during the operation of the radar unit.

SUMMARY

The present disclosure is designed to address at least one of the aforementioned problems and/or meet at least one of the aforementioned needs. By providing an accurate reference measurement to an inertial-based location system, sensor bias or errors can both be determined and mitigated. Therefore, using a radar system to provide an airspeed measurement to an inertial-based location system may allow the inertial-based location system to perform more accurately.

In one example, a method is provided that includes transmitting a radar signal with an antenna of an airborne platform. The method also includes receiving at least one radar reflection with the antenna. As part of the method, one or more processors may be configured to determine (i) a falling edge of a Doppler signature of the received radar reflection and (ii) a signal representative of an airspeed based on the falling edge of the Doppler signature. Additionally, the method includes providing the determined signal representative of the airspeed to an inertial measurement system. Further, the method includes determining location parameters of the airborne platform by the inertial measurement system, where the step of determining comprises determining at least one sensor adjustment for the inertial measurement unit based on the determined signal representative of the airspeed. Finally, the method includes operating the inertial measurement system in a mode having the sensor adjustment.

In still another example, a system is provided that comprises an antenna unit, a processing unit, and an inertial measurement system. The system may include additional features such as at least one storage device, a navigation unit, and a satellite-based location system. The antenna unit of the system may be configured to transmit a radar signal and receive at least one radar reflection. The processing unit of the system may be configured to (i) determine a falling edge of a Doppler signature of the received radar reflection, (ii) determine an airspeed based on the falling edge of the Doppler signature, and (iii) provide the determined signal representative of the airspeed to an inertial measurement system. The inertial measurement system of the disclosed system may be configured to determine location parameters of the airborne platform, by determining at least one sensor adjustment for the inertial measurement unit based on the determined signal representative of the airspeed. The inertial measurement system of the disclosed system may also be configured to operate in a mode having the sensor adjustment.

In another example, a non-transitory computer readable medium having stored thereon instructions that, upon being executed by a computing device, cause the computing device to perform functions is provided. The functions include transmitting a radar signal with an antenna of an airborne platform. The functions also include receiving at least one radar reflection with the antenna. As part of the functions, one or more processors may be configured to determine (i) a falling edge of a Doppler signature of the received radar reflection and (ii) an airspeed based on the falling edge of the Doppler signature. Additionally, the functions include providing the determined signal representative of the airspeed to an inertial measurement system.

Further, the functions include determining location parameters of the airborne platform by the inertial measurement system, where the determining step comprises determining at least one sensor adjustment for the inertial measurement unit based on the provided determined signal representative of the airspeed. Finally, the functions include operating the inertial measurement system in a mode having the sensor adjustment.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Examples, systems and methods for a radar system for use on an airborne platform are described, which may be useful for purposes of providing velocity measurements to the airborne platform. The velocity measurements provided by the presently disclosed radar system may enable the airborne platform to achieve accurate velocity measurements. For example, the presently disclosed radar system may be useful in situations when other velocity measurement systems, such as satellite-based location systems, are not functioning correctly or not available.

Example systems and methods may enable a velocity measurement from the radar system to be used by a navigational (or location) system of the airborne platform. The velocity measurement from the radar system may be used to supplement (or replace) other velocity calculations performed by systems of the airborne platform.

Within examples, an airborne platform may occasionally operate in situations where its satellite-based location system(s) may not be functioning correctly. For example, satellite-based location systems may have errors due to hardware failures, the inability to locate satellite signals, jamming of satellite signals, or for other reasons. When the satellite-based location system is lost, the airborne platform may resort to other means to locate itself. For example, in traditional systems, the airborne platform may use an inertial measurement system to determine movement parameters, and therefore location, of the airborne platform. Although the inertial measurement system may provide some movement parameters, inertial measurements are susceptible to errors. A drift, bias, or other error in a sensor may cause the movement parameters of the inertial measurements to be inaccurate, and possible become more inaccurate the longer the measurements are used. Thus, it may be desirable to have a system that may be able to correct for the drift, bias, or other error in a sensor so an accurate velocity measurement may be provided by the radar system. Therefore, providing a velocity measurement to an inertial measurement system may be used as reference to help determine sensor offsets in the inertial measurement system.

Figure 1:
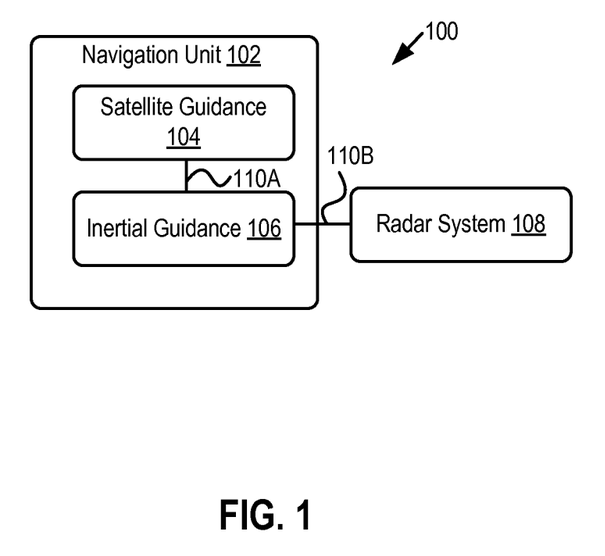
FIG. 1 is a diagrammatic representation of a block diagram showing an example system including a radar system and a navigation unit.

Referring now to the figures, FIG. 1 is a block diagram showing an example system 100 including a radar system. A radar system 108 may be coupled to a navigation unit 102 by a communication link 110B. The navigation unit 102 may further include a satellite-based guidance (or location) system 104 coupled to an inertial guidance system 106 by a communication link 110A. The communication links 110A and 100B may be wired, wireless, or other form of communication link. Additionally, the layout of the blocks of system 100 are one example layout. One skilled in the art would understand that blocks may be combined, merged, moved, removed, and the communication links may have alternate paths, while still functioning within the present disclosure. For example, in some instances, the radar system 108 may be integrated within navigation unit 102.

The radar system 108 may be configured to operate in at least one of several modes. In some examples, an airborne platform may feature more than one radar system. For example, the airborne platform may feature multiple radar systems, each having a specific functionality. One radar system may be configured to operate with multiple radar beams. The multiple-beam radar system may be operational to track various objects (i.e. radar targets) within a field of view of the airborne platform. The objects tracked by the multiple beam radar may be airborne objects, land-based objects, objects on the surface of water, or objects in space. Another radar system may feature a single beam. This single-beam radar may be operational to provide velocity information to the airborne platform. However, in some instances, the multiple-beam radar system may also be adapted to provide velocity information to the airborne platform.

The radar system 108 may include a radar transmission unit and a radar reception unit. The radar transmission unit may be configured to create a signal for transmission by an antenna of the radar system. In various embodiments, the radar signal generated for transmission by the radar unit may take many forms. In some examples, the radar signal may occupy a single channel of radio spectrum. The radar signal for transmission may or may not be modulated depending on the specific embodiment. Additionally, the radar signal for transmission may be pulsed or continuous wave depending on the specific embodiment. Further, the transmitted radar signal may have an associated carrier frequency (and/or frequency modulation). The carrier frequency may be varied depending on the specific embodiment.

The antenna of the radar system may take different forms in various examples of the radar system. The antenna may be a single antenna unit that both transmits and receives the radar signals. Additionally, the antenna may have a relatively wide beamwidth. In one example, the antenna used in the presently disclosed system and methods may have a wide beamwidth approaching 180 degrees. Thus, radar energy may be effectively transmitted and received across the full beamwidth of the antenna. Typical antennas used with aircraft radar have a quite narrow beamwidth, on the order of a several degrees. Therefore, the present antenna may have a much wider beamwidth than typical airborne platform radar systems. Additionally, the antenna used herein may be simpler to implement than the narrow-beam antennas used with typical radar systems. Although the disclosure generally describes the antenna as having a wide beamwidth, more narrow beamwidth antennas may be used as well. For example, a more narrow beam antenna that is generally pointed toward the horizon may be used within the present disclosure as well.

The receiver of the radar system may be configured to receive radar signals that are reflected back to the antenna of the radar system. The receiver may be configured to output a signal based on the received radar reflections. When objects reflect radar signals, each signal may be reflected with a frequency shift (i.e. Doppler shift, as presented by Equation 1 below). The velocity between the object transmitting the radar signal and the object that causes the radar reflection causes the frequency shift. In Equation 1, $\Delta f$ is the frequency shift associated with a reflection, $\Delta v$ is the velocity difference between the transmitter and the reflector, c is the speed of light, and $f_0$ is the carrier frequency of the transmitted radar signal.

$$\Delta f = \frac{2\Delta v}{c} f_0 \qquad \text{EQUATION 1}$$

The frequency shift, as measured in Hertz (Hz), would be dependent on the transmission frequency as well as relative velocity. In the following example, the carrier frequency is assumed to be 30 gigahertz (GHz). For example, if an airplane is traveling 223 meters/second and a stationary object reflects the radar signal, the frequency shift would be 44.6 kilohertz (kHz). In another example, if an airplane is traveling 223 meters/second and an object moving 223 meters/second in the same direction reflects the radar signal, the frequency shift will be that of no relative motion difference. Therefore, the frequency shift would be 0 Hz. In yet another example, if an airplane is traveling 223 meters/second and an object moving 44.7 meters/second in the opposite direction reflects radar, the frequency shift would be 53.54 kHz.

In some instances, the receiver may mix the received signals with the transmitted signal (i.e. a signal with the carrier frequency). By mixing the received signals with the transmitted signal, the Doppler frequency offset created by reflected signals may be shifted down to a baseband level signal. The output may be called a Doppler spectrum. The Doppler spectrum provides the reflections that the radar unit received and the frequency offset associated with the reflection. Therefore, the relative speed between the reflector and the transmitter may be calculated based on the Doppler spectrum. Further, the relative speed between the reflector and the transmitter may be calculated without the step of mixing down-conversation as well.

The navigational unit 102 may be configured to provide location and guidance information to a computer system of the airborne platform. In some examples, the navigational unit 102 may contain more or fewer components than those shown in FIG. 1. As shown in FIG. 1, the navigational unit 102 may include a satellite guidance unit 104 and an inertial guidance unit 106.

As previously discussed, the satellite guidance unit 104 may be able to provide both location and airspeed (e.g., velocity) information for the airborne platform. The satellite guidance unit 104 may be able to determine location information through satellite-based location systems, such as GPS, GLONASS, or GNSS. Additionally, GPS, GLONASS, and GNSS may be able to provide the airspeed of the airborne platform as well.

In some instances, the satellite guidance unit 104 may not operate correctly. For example, a hardware failure or radio jamming may cause the satellite guidance unit 104 to not be able to provide satellite-based location information to the airborne platform. When satellite guidance unit 104 cannot provide location information, the navigation unit may use fallback systems to determine velocity and location for the airborne platform.

The inertial guidance unit 106 may include both accelerometers and gyroscopes, or similar components, which may be used together to determine movement parameters of the airborne platform. In particular, the accelerometers can measure the orientation of the IMU with respect to Earth, as well as measure an acceleration around any translational degree of freedom of the airborne platform, such as forward/backward, left/right, and up/down. The gyroscope measures the rotation around an axis, such as pitch, yaw, and roll.

Some inertial guidance units 106 may include are commercially available as low-cost, low-power package inertial measurement units (IMUs). For instance, an IMU of the inertial guidance units 106 may take the form of or include a miniaturized MicroElectroMechanical System (MEMS) or a NanoElectroMechanical System (NEMS). Other types of IMUs may also be utilized as part of the inertial guidance unit 106. For example, an IMU using accelerometers and 3-ring laser gyroscopes may be used as well. Therefore, an airborne platform may be able to determine movement parameters, such as location and velocity with the inertial measurements. However, in some instances, as previously discussed, inertial measurement may have an increased susceptibility to sensor errors, such as sensor drift. For example, if a sensor has a drift (or other error or bias), location information provided by the inertial-based location system may decrease in accuracy as the amount of time the system is used increases.

Figure 2:
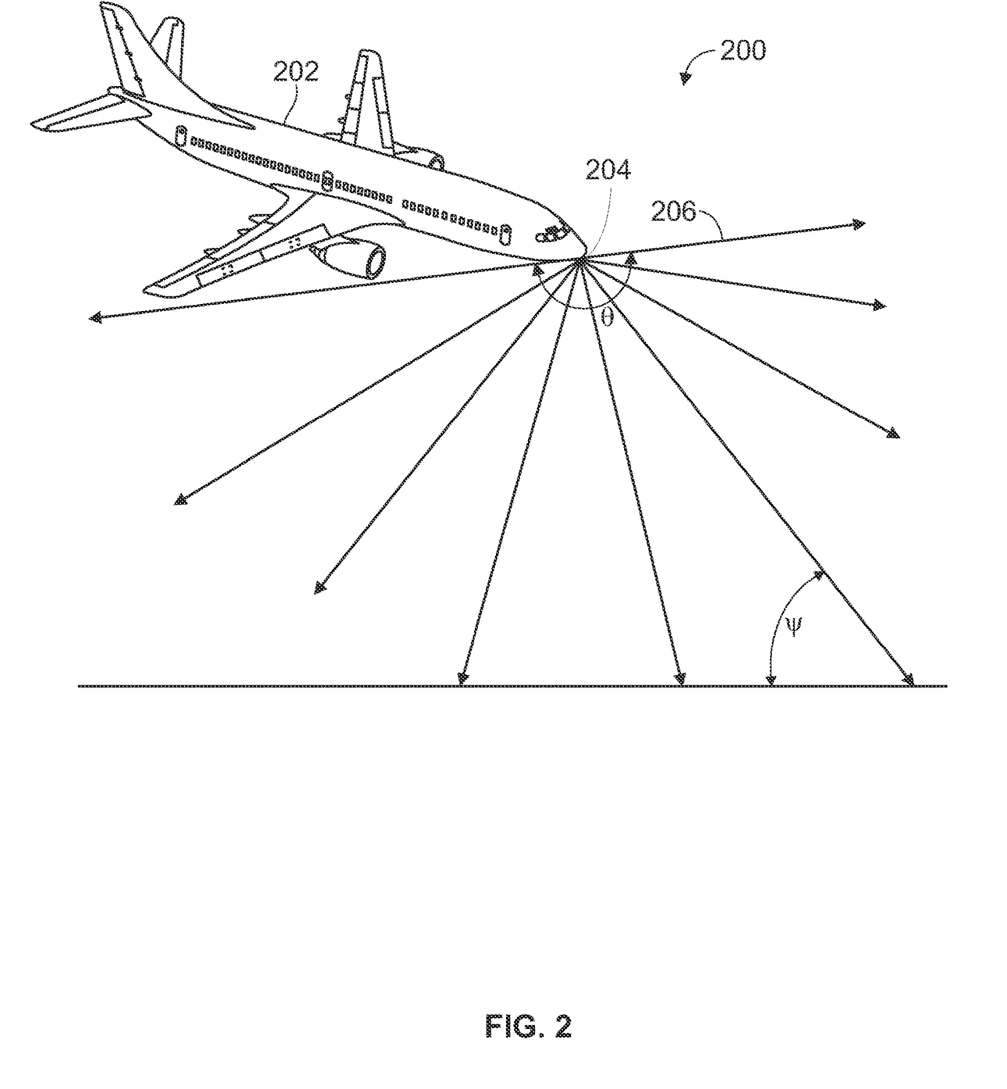
FIG. 2 illustrates a diagrammatic representation of an example airborne platform having a Doppler velocity radar.

FIG. 2 illustrates an example airborne platform 200 including aircraft 202. The aircraft 202 may take the form of any type of aircraft, such as personal aircraft, commercial jetliners, military aircraft, or any other type of aircraft. As shown in FIG. 2, aircraft 202 may be outfitted with a radar unit 204. The radar unit may include an antenna, transmitter, and receiver.

The antenna may consist of a wide beam antenna such that energy is radiated across 180 degrees of its field of view. Moreover, the antenna is specifically designed to emit energy parallel, as well as perpendicular, to the ground.

By having the beamwidth 206 cover the entire hemisphere underneath the aircraft, energy is emitted both parallel and perpendicular to the ground. When the incident angle $\Psi$ approaches 0, the maximum Doppler shift will be realized. However, the energy transmitted will not reflect off the ground below, as the energy is transmitted parallel to the ground. Thus, the falling edge of the received Doppler spectrum will identify the maximum Doppler shift of the received signal and, thus, provide the information necessary to determine the aircraft's velocity. In Equation 2, $f_r$ is the frequency of the reflected signal, $f_0$ is the carrier frequency of the transmitted radar signal, $\Psi$ is the incident angle between the ground and the radar signal, v is the relative velocity between the transmitter and the reflector, and c is the speed of light.

$$f_r = f_0\left(1 + 2\cos(\psi) * \frac{v}{c}\right) \quad \text{EQUATION 2}$$

Additionally, because the velocity of the aircraft is determined by evaluating the falling edge of the received Doppler spectrum, the measurements are not very susceptible to errors caused by a vertical or left/right motion of the airborne platform or by variations of the surface below the aircraft. Thus, the calculation is close to completely independent of the motion of the airborne platform other than the airborne platform forward velocity, making the measurement accurate in many situations.

Figure 3:
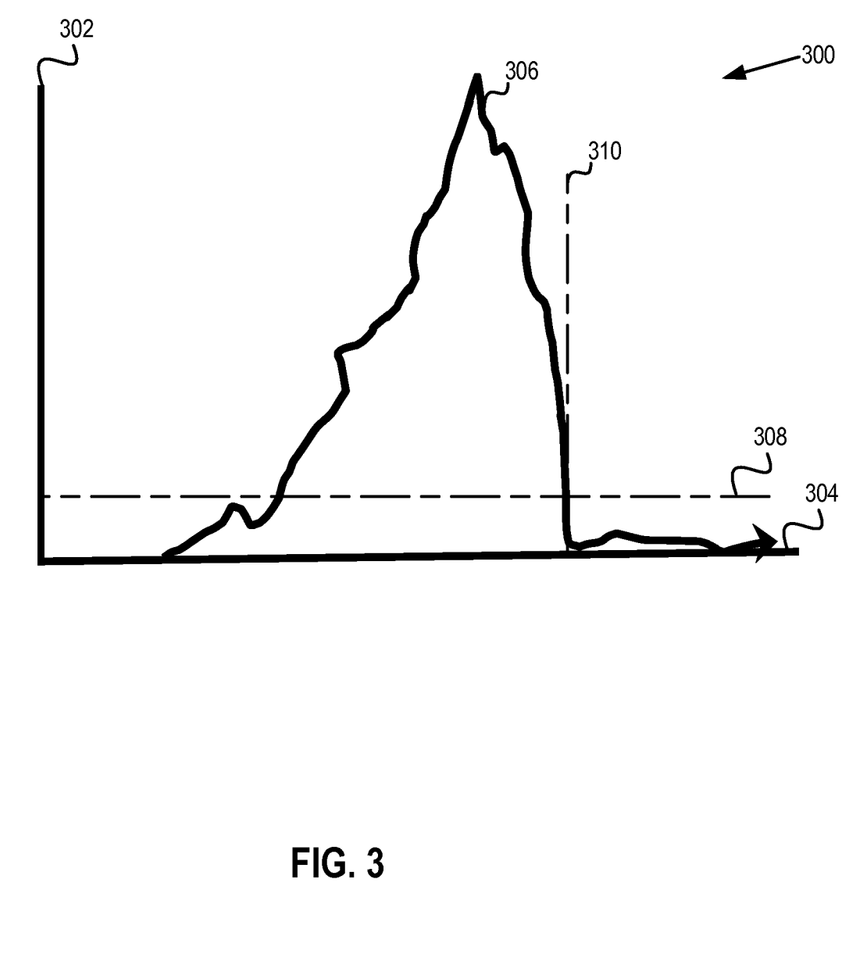
FIG. 3 shows a diagrammatic representation of an example Doppler spectrum in accordance with the present disclosure.

FIG. 3 shows an example Doppler spectrum 300 (i.e. Doppler signature) in accordance with the present disclosure. As previously discussed, the Doppler spectrum 300 is a plot of the magnitude of the reflections that the radar unit received and the frequency offset associated with the reflections. Therefore, the relative speed between the reflector and the transmitter may be calculated based on the Doppler spectrum 300. Axis 302 is a measure of the magnitude of the reflection and axis 304 is a measure of the frequency offset of the reflection. The line 306 is the measure of the amplitude of Doppler spectrum as a function of frequency shift.

As previously discussed, when objects reflect radar signals, each signal may be reflected with a frequency shift (as presented by Equation 1 above). The horizontal axis 304 is the frequency offset plotted by line 306. The frequency offset is caused by the relative velocity between the object transmitting the radar signal and the object that causes the radar reflection. To determine a speed of the airborne platform, a threshold amplitude 308 may be set. The threshold amplitude may be chosen to minimize noise and/or small moving reflecting objects from causing errors in the speed calculation. Based on the specific operating criteria, the threshold amplitude 308 may be increased or decreased.

Figure 4:
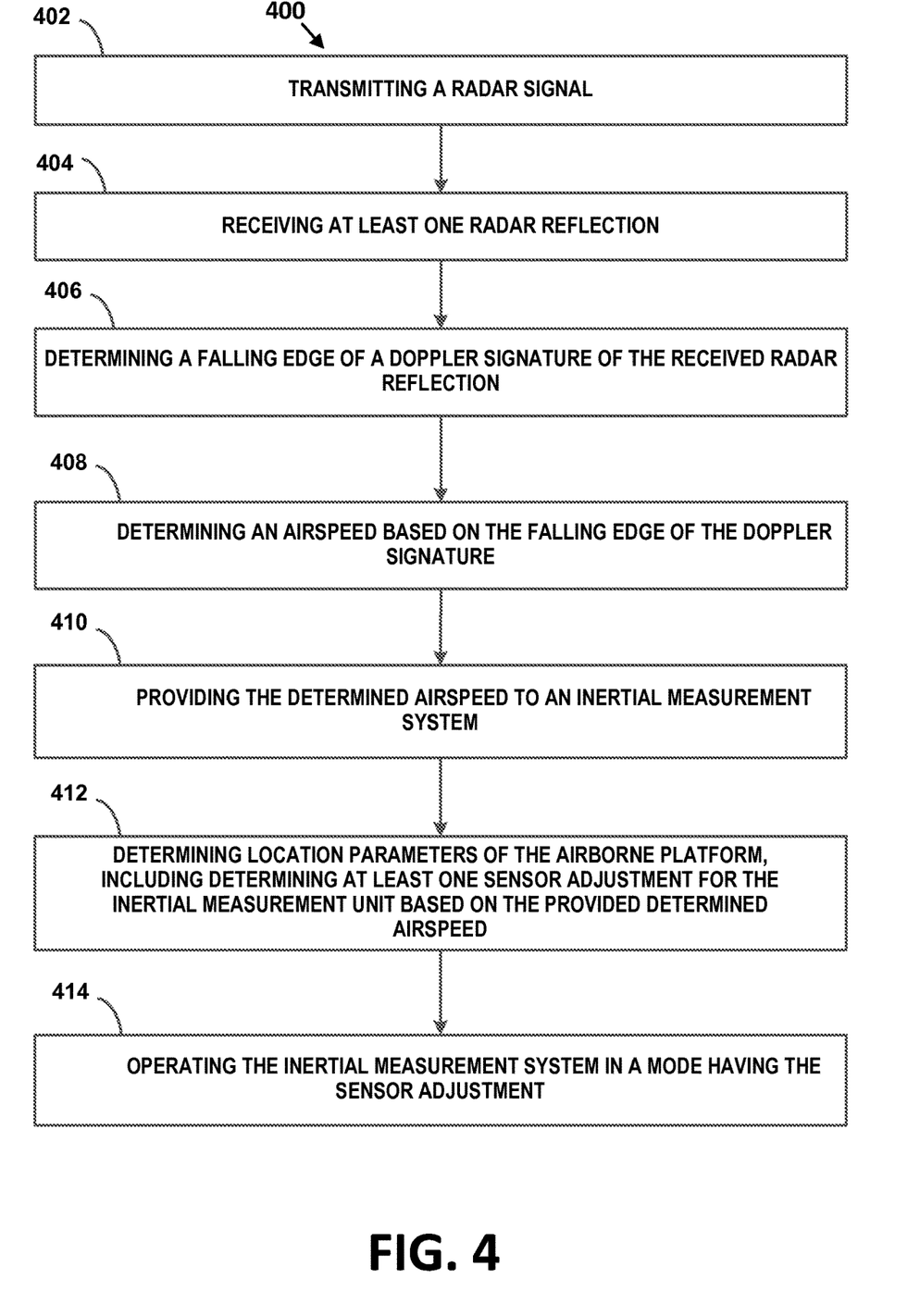
FIG. 4 is a diagrammatic representation of an example method for use with the Doppler velocity radar.

Method 400 shown in FIG. 4 presents an embodiment of a method that, for example, could be used with the system shown in FIG. 1, for example, and may be performed by a computing device (or components of a computing device) coupled with components of FIG. 1. Example devices or systems may be used or configured to perform logical functions associated with FIGS. 2 and 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 400 may include one or more operations, functions, or actions as illustrated by one or more of blocks 402-414. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 4 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes transmitting a radar signal. An antenna unit of an airborne platform may transmit the radar signal. The radar system may include a radar having a transmission unit configured to create a signal for transmission by an antenna of the radar system. In various embodiments, the radar signal generated for transmission by the radar unit may take many forms. In some examples, the radar signal may occupy a single channel of radio spectrum. By only occupying a single radio channel, the radar signal and associated computational system may be simpler than traditional radar systems. The radar signal for transmission may or may not be modulated depending on the specific embodiment. For example, the radar signal may include a linear frequency modulation. Various modulations may enable the radar system to more accurately measure the range to various reflectors. However, in some instances, an unmodulated radar signal may be used as well. An unmodulated radar signal may be beneficial because it may not appear to be a sophisticated radar signal to radar receivers (or other devices) that are not part of the airborne platform.

The radar signal for transmission may be pulsed or continuous wave depending on the specific embodiment. Further, the transmitted radar signal may have an associated carrier frequency (and/or frequency modulation). The carrier frequency may be varied depending on the specific embodiment. Additionally, the radar signal may be transmitted with an associated power level. The power level of the radar signal transmitted in the present disclosure may be a lower power level than traditional narrow-beamed radar systems. The power level may be lower because the radar system is not designed to detect small moving objects, rather the present disclosure detects reflections from the surface below the aircraft. Further, a low-power single-channel radar signal transmitted by the airborne platform may be harder to be detected by objects other than the aircraft. For example, other aircraft and/or terrestrial-based radar receivers may not detect the low-power single-channel radar signal. Additionally, a low-power single-channel radar signal transmitted by the airborne platform may not appear to be a aircraft-based radar signal if it is received by an object other than the aircraft transmitting the signal. For example, because the presently transmitted radar signal may not contain any modulated information and/or modulated signaling, some receiving systems may discard a received signal as noise.

As previously discussed, the antenna of the radar system may take different forms in various examples of the radar system. In one example, the present disclosure may be used with antennas designed for use in other radar systems. These antennas may be used in conjunction to act as one single wide-beam antenna.

The antenna of the present disclosure may be a single antenna unit that both transmits and receives the radar signals. Additionally, the antenna may have a relatively wide beamwidth as compared to traditional airborne platform radar systems. In one example, the antenna used in the presently disclosed system and methods may have a beamwidth approaching 180 degrees. Thus, radar energy may be effectively transmitted and received over the beamwidth of the antenna. Typical antennas used with aircraft radar have a quite narrow beamwidth, on the order of a several degrees. Therefore, the present antenna may have a much wider beamwidth those typical airborne platform radar systems. Additionally, the antenna used herein may be a simpler antenna than the narrow-beam antennas used with typical radar systems.

In one embodiment, the signal processing of the present disclosure may be relatively simple Doppler signal processing involving only a single channel radar with a simple broadband antenna. In such embodiment, the need for additional radar channels and multiple narrow beam antennas with sophisticated tracking and signal processing as used in legacy velocity measurement systems will have been eliminated.

At block 404, the method 400 includes receiving at least one radar reflection. The antenna unit of an airborne platform may receive the radar signal that has reflected from various objects, such as the ground. In some examples, the same antenna that transmitted the radar signal may be configured to receive the reflected signals. In other examples, a different antenna (or multiple antennas) of the airborne platform may be configured to received the reflected radar signals. The receiver may be configured to output a signal based on the received radar reflections. Additionally, the receiver may be configured, with the aid of a processor, to determine Doppler spectrum of the received signal. When objects reflect radar signals, each signal may be reflected with a frequency shift (i.e. Doppler shift, previous presented as Equation 1 and Equation 2). The frequency shift is caused by the speed between the object transmitting the radar signal and the object that causes the radar reflection.

As previously discussed, in some instances, the receiver may mix the received signals with the transmitted signal (i.e. a signal with the carrier frequency). By mixing the received signals with the transmitted signal, the Doppler offset frequency offset created by reflected signals may be shifted down to a baseband level signal. The output may be called a Doppler spectrum. The Doppler spectrum provides the reflections that the radar unit receives and the frequency offset associated with the reflection. Therefore, the relative speed between the reflector and the transmitter may be calculated based on the Doppler spectrum. Further, the relative speed between the reflector and the transmitter may be calculated without the step of mixing down-conversation as well.

At block 406, the method 400 includes determining, by one or more processors, a falling edge of a Doppler signature of the received radar reflection. As discussed with respect to FIG. 3, the falling edge of the Doppler signature of the received radar reflection corresponds to the velocity of the airborne platform. The processor may determine the falling edge based on a threshold amplitude of the Doppler signature. The threshold may be chosen to minimize noise and/or reflections from undesirable objects. The falling edge of the Doppler spectrum may be defined as the highest frequency shift that defines the end of the Doppler spectrum signal structure. This falling edge may correspond to the airspeed of the airborne platform.

At block 408, the method 400 includes determining, by the one or more processors, an airspeed based on the falling edge of the Doppler signature. In some examples, the system may determine an airspeed or it may determine a signal representative of the airspeed. The signal representative of the airspeed may include a calculated and/or determined airspeed. After the falling edge of the Doppler spectrum has been determined, a frequency shift of the received signal corresponding to the airspeed is known. This frequency shift can be used with Equation 1 to determine the difference in velocity between the airborne platform and the object that caused the reflection. Because the threshold value may have been chosen to minimize reflections from other moving objects, such as airplanes and/or cars, the frequency shift may correspond to an object that is stationary, such as the ground. Therefore, by knowing the frequency shift, the airspeed of the airborne platform may be determined.

At block 410, the method 400 includes providing the determined signal representative airspeed to an inertial measurement system. The airspeed determined from reflections at block 408 may be provided to the inertial measurement system, so the inertial measurement system has a reference measurement. Because inertial-based location systems are capable of providing location information based on the measurement of movements of the airborne platform, they may be susceptible to sensor errors, such as sensor drift. For example, if a sensor has a drift (or other error or bias), location information provided by the inertial-based location system may decrease in accuracy as the amount of time the system is used. By providing an accurate reference measurement, such as the airspeed determined from reflections at block 408, to an inertial-based location system, sensor bias can both be determined and mitigated. Inertial system biases may be removed by a continuously updated velocity state provided by the Doppler measurements.

At block 412, the method 400 includes determining location parameters of the airborne platform by the inertial measurement system, including determining at least one sensor adjustment for the inertial measurement unit based on the provided determined signal representative of the airspeed. When the airborne platform is operated with the inertial measurement system, location and velocity information is determined by the inertial measurement system. However, because the accuracy of the inertial measurement system may not either be known or trusted, a reference measurement may be used to verify the accuracy and/or calculate an adjustment for the inertial measurement system.

To determine an adjustment, a processor or other computing device, may compare an airspeed determined by the inertial measurement system with an airspeed calculated based on the radar reflections. The processor may then determine the difference between the airspeed determined from the inertial measurement system and the airspeed calculated based on the radar reflections. The airspeed difference may be assumed to be caused by an error or bias in the inertial measurement system. In some examples, the step in block 412 may be performed multiple times to iteratively adjust a calculated sensor adjustment. The step in block 412 may be performed until the airspeed determined by the inertial measurement system and the airspeed calculated based on the radar reflections converge to a better estimate of the true velocity.

At block 414, the method 400 includes operating the inertial measurement system in a mode having the sensor adjustment. Once the sensor adjustment is determined at block 412, the inertial measurement system may be operated with the sensor adjustment. By operating the inertial measurement system with the sensor adjustment, the inertial measurement system may provide more accurate location and velocity information than it did before the adjustment. For example, the adjustment to the inertial measurement system may be able to mitigate or remove a sensor bias or error. Thus, the airborne platform may be able to accurately know velocity and location information without the use of satellite-based navigation systems. In some examples, the airborne platform may periodically perform method 400 to either verify the accuracy or re-adjust the sensor adjustments that are both determined and used in the operation of the inertial measurement system.

Figure 5:
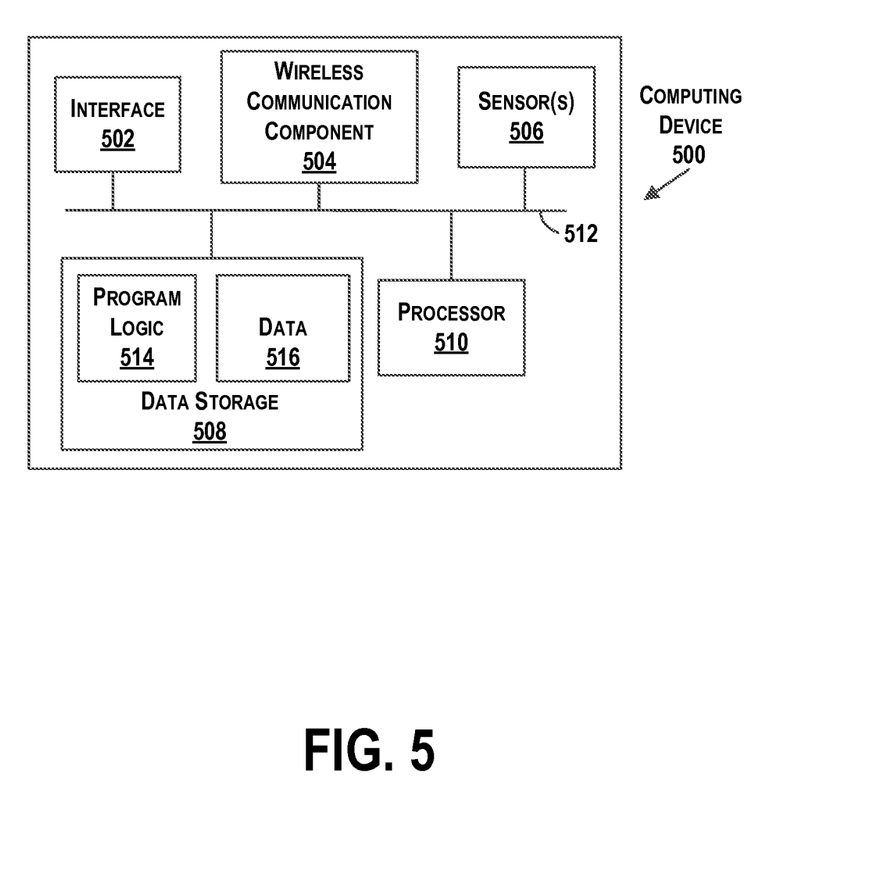
FIG. 5 illustrates a diagrammatic representation of a schematic drawing of an example computing device.

As mentioned, portions of the method 400 may be performed by a computing device (or components of a computing device), as well as by components of elements shown in FIG. 1. FIG. 5 illustrates a schematic drawing of an example computing device 500. The computing device 500 in FIG. 5 may represent devices shown in FIG. 1 including the radar system 108, navigation unit 102, satellite-based guidance (or location) system 104, and/or inertial guidance system 106, or the computing device 500 may represent the operations of system 100 in general. In some examples, some components illustrated in FIG. 5 may be distributed across multiple computing devices. However, for the sake of example, the components are shown and described as part of one example device 500.

The computing device 500 may include an interface 502, a wireless communication component 504, sensor(s) 506, data storage 508, and a processor 510. Components illustrated in FIG. 5 may be linked together by a communication link 512. The computing device 500 may also include hardware to enable communication within the computing device 500 and between the computing device 500 and another computing device (not shown), such as a server entity. The hardware may include transmitters, receivers, and antennas, for example.

The data storage 508 may store program logic 514 that can be accessed and executed by the processor 510. The data storage 508 may also store collected sensor data and/or radar data as the data 516. For example, the processor 510 may use the data 516 to both determine the airspeed for the airborne platform as well as determine sensor adjustment for use with the inertial measurement unit.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   transmitting a radar signal with an antenna unit of an airborne platform, wherein a beamwidth of the antenna unit covers a hemisphere underneath an aircraft;
   receiving at least one radar reflection with the antenna unit;
   determining, by one or more processors, if a falling edge of a Doppler signature of the received radar reflection is greater than a threshold amplitude, wherein the threshold amplitude of the Doppler signature is an amplitude level that reduces reflections from undesirable moving objects, and wherein the Doppler signature is a magnitude of the reflections that the radar unit received and a frequency offset associated with the least one radar reflection;
   determining, by the one or more processors, a signal representative of an airspeed based on the falling edge of the threshold amplitude of the Doppler signature exceeding the threshold;
   providing the signal representative of the airspeed to an inertial measurement system;
   determining location parameters of the airborne platform by the inertial measurement system, including determining at least one sensor adjustment for the inertial measurement unit based on the signal representative of the airspeed to offset a drift or bias in the inertial measurement unit; and
   operating the inertial measurement system in a mode having the sensor adjustment.

2. The method of claim 1, wherein the radar signal is transmitted on a single channel with a continuous wave modulation.

3. The method of claim 1, wherein said determining the signal representative of the airspeed comprises calculating a frequency offset between a frequency of the transmitted radar signal and the received radar signal.

4. The method of claim 3, wherein the determining further comprises calculating the highest frequency offset.

5. The method of claim 1, wherein the antenna unit comprises a single antenna.

6. The method of claim 1, further comprising receiving data from a satellite-based location system.

7. The method of claim 6, wherein the method is performed in response to an error in a satellite-based location calculation.

8. A system comprising:
   an antenna unit configured to:
     transmit a radar signal by an antenna having a beamwidth covering a hemisphere underneath an aircraft; and
     receive at least one radar reflection;
   a processing unit configured to:
     determine if a falling edge of a Doppler signature of the received radar reflection is greater than a threshold amplitude, wherein the threshold amplitude of the Doppler signature is an amplitude level that reduces reflections from undesirable moving objects and wherein the Doppler signature is a magnitude of the reflections that the radar unit received and a frequency offset associated with the at least one radar reflection;

determine a signal representative of an airspeed based on the falling edge of the threshold amplitude of the Doppler signature exceeding the threshold; and provide the determined signal representative of the airspeed to an inertial measurement system;

an inertial measurement system configured to:

determine location parameters of the airborne platform, including determining at least one sensor adjustment for the inertial measurement unit based on the signal representative of the airspeed to offset a drift or bias in the inertial measurement unit; and operate in a mode with the sensor adjustment.

9. The system of claim 8, wherein the radar unit is further configured to transmit a radar signal on a single channel with a continuous wave modulation.

10. The system of claim 8, wherein the processing unit is further configured to determine the signal representative of the airspeed based on calculating a frequency offset between a frequency of the transmitted radar signal and the received radar signal.

11. The system of claim 10, wherein the processing unit is further configured to calculate the highest frequency offset.

12. The system of claim 8, wherein the antenna unit comprises a single antenna.

13. The system of claim 8, further comprising a navigation unit, wherein the navigation unit comprises the inertial measurement system and a satellite-based location system.

14. The system of claim 13, wherein the processing unit is further configured to provide the airspeed to the inertial measurement system in response to an error in the satellite-based location system.

15. A non-transitory computer readable medium having stored thereon instructions that, upon executed by a computing device, cause the computing device to perform functions, the functions comprising:

transmitting a radar signal with an antenna unit of an airborne platform having a beamwidth covering a hemisphere underneath an aircraft;

receiving at least one radar reflection with the antenna unit;

determining, by one or more processors, if a falling edge of a Doppler signature of the received radar reflection is greater than a threshold amplitude, wherein the threshold amplitude of the Doppler signature is an amplitude level that reduces reflections from undesirable moving objects, and wherein the Doppler signature is a magnitude of the reflections that the radar unit received and a frequency offset associated with the at least one radar reflection;

determining, by the one or more processors, a signal representative of an airspeed based on the falling edge of the threshold amplitude of the Doppler signature exceeding the threshold;

providing the determined signal representative of the airspeed to an inertial measurement system;

determining location parameters of the airborne platform by the inertial measurement system, including determining at least one sensor adjustment for the inertial measurement unit based on the signal representative of the airspeed to offset a drift or bias in the inertial measurement unit; and operating the inertial measurement system in a mode having the sensor adjustment.

16. The computer readable medium of claim 15, wherein the radar signal is transmitted on a single channel with a continuous wave modulation.

17. The computer readable medium of claim 15, wherein said determining the signal representative of the airspeed comprises calculating a frequency offset between a frequency of the transmitted radar signal and the received radar signal.

18. The computer readable medium of claim 17, wherein the determining further comprises calculating the highest frequency offset.

19. The computer readable medium of claim 15, wherein the antenna unit comprises a single antenna.

20. The computer readable medium of claim 15, further comprising receiving data from a satellite-based location system, wherein the functions are performed in response to an error in a satellite-based location calculation.

21. A method selectively operating an aircraft navigational system in one of a plurality modes comprising:

operating in a first mode when a satellite-based location information is available, wherein the first mode comprises using an inertial based measurement system with the satellite-based location information to measure a velocity of an aircraft;

operating in a second mode when a satellite-based location information is not available, wherein the second mode comprises using a radar system onboard the aircraft having a beamwidth of an antenna unit that covers a hemisphere underneath the aircraft to determine a signal representative of the aircraft's velocity and providing the signal representative of the aircraft's velocity to the inertial based measurement system to determine at least one sensor adjustment for the inertial measurement unit based on the signal representative of the airspeed to offset a drift or bias in the inertial measurement unit, wherein the signal representative of the velocity of the aircraft is based on the falling edge of a Doppler signature of a received radar reflection being greater than a threshold amplitude, and wherein the threshold amplitude of the Doppler signature is an amplitude level that reduces reflections from undesirable moving objects, and wherein the Doppler signature is a magnitude of the reflections that the radar unit received and a frequency offset associated with the received radar reflection.

22. The method of claim 21, wherein determining the signal representative of the airspeed comprises calculating a highest frequency offset between a frequency of the transmitted radar signal and the received radar signal.

* * * * *